United States Patent

Larsson

[11] Patent Number: 5,931,728
[45] Date of Patent: Aug. 3, 1999

[54] DEVICE FOR CARRYING OUT MECHANICAL TOOLING OF A VALVE SEAT

[75] Inventor: Lars-Inge Larsson, Ljungsbro, Sweden

[73] Assignee: Larslap AB, Linkoping, Sweden

[21] Appl. No.: 08/899,962

[22] PCT Filed: Jan. 12, 1996

[86] PCT No.: PCT/SE96/00021

§ 371 Date: Jul. 24, 1997

§ 102(e) Date: Jul. 24, 1997

[87] PCT Pub. No.: WO96/26031

PCT Pub. Date: Aug. 29, 1996

[30] Foreign Application Priority Data

Feb. 20, 1995 [SE] Sweden .................................. 9500605

[51] Int. Cl.[6] .......................... B24B 21/18; B24B 33/00; B24B 47/26; B24B 55/00
[52] U.S. Cl. .......................... 451/439; 451/430; 451/440
[58] Field of Search .................................. 451/430, 431, 451/415, 252, 439, 440, 115, 36, 523, 524, 542, 49, 51; 408/72 R, 80, 79, 83.5, 82

[56] References Cited

U.S. PATENT DOCUMENTS

| | | |
|---|---|---|
| 742,313 | 10/1903 | Hagspiel . |
| 1,658,141 | 2/1928 | Skinner . |
| 4,169,487 | 10/1979 | Watson ..................................... 451/430 |
| 4,338,961 | 7/1982 | Karpenko ................................. 451/430 |
| 4,346,728 | 8/1982 | Sulzer ..................................... 451/430 |
| 4,715,149 | 12/1987 | Kelsey . |

FOREIGN PATENT DOCUMENTS

| | | |
|---|---|---|
| 211595 | 8/1909 | Germany . |
| 240420 | 3/1911 | Germany . |

*Primary Examiner*—David A. Scherbel
*Attorney, Agent, or Firm*—Merchant, Gould, Smith, Edell, Welter & Schmidt, P.A.

[57] ABSTRACT

The invention concerns an arrangement for machining a valve seat (1a) in a valve housing (1). The housing has a circular opening (1d) which is concentric with the seat (1a) and about which is a flat annular surface (1e). The arrangement comprises a support (2) arranged such that it is held by the valve housing (1) and such that, in an axial direction perpendicular to the plane of the annular surface (1e), it holds a tool pillar (3). At its distal end the tool pillar (3) has a machining tool (4). The support (2) comprises firstly a main part with three wings uniformly distributed about the tool pillar (3). Each wing comprises a first wing part (2b) which is operatively connected to the first wing part so that these wing parts (2a, 2b) can slide relative to each other along the sliding surface. Members (2b2, 2b3, 2b4, 2b5) are provided for detachably securing the wing parts (2a, 2b) relative to each other and the support (2) relative to the valve housing (1).

4 Claims, 1 Drawing Sheet

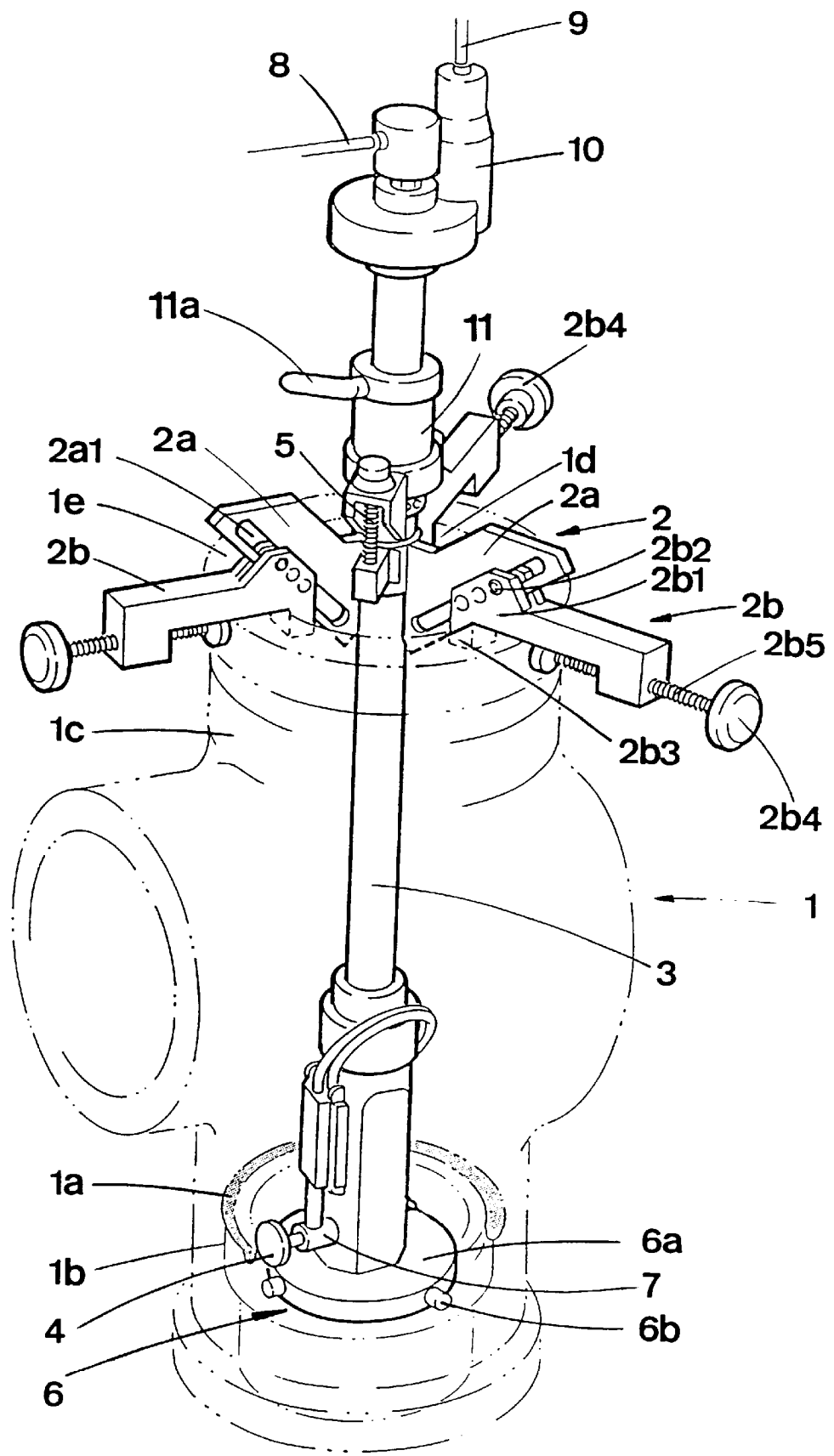

5,931,728

DEVICE FOR CARRYING OUT MECHANICAL TOOLING OF A VALVE SEAT

FIELD OF THE INVENTION

The present invention concerns an arrangement for machining a valve seat in a valve housing having a circular opening which is concentric with the seat and about which is disposed a flat annular surface, the arrangement comprising a support, disposed so as to be centred relative to the opening and secured with the valve housing, and a tool pillar which is connected to the support and which, at its distal end, is provided with a machining tool, the support being arranged such that in a direction which, when the arrangement is in use, is perpendicular to the annular surface, it holds the tool pillar such that it can be adjusted in this direction, and the tool is arranged so as to rotate about the tool pillar.

BACKGROUND OF THE INVENTION

An arrangement of this type has already been disclosed by DE-240 420. In this case the support for centring the tool pillar comprises a cone, which is displaceable along the tool pillar and whose tip is directed downwards, and horizontal jaws which cooperate with the conical surface of the cone and which are disposed such that, when the cone moves downwards, they are pressed with very great force against the circular opening in the valve housing in order thus to bring about the desired centring. In order to ensure centring, however, the machining tool has to cooperate with the opening which is delimited by the valve seat. This obviously gives rise to serious restrictions in terms of performance of the machining tool. A further disadvantage is that the cone and jaws with holders therefor render it substantially more difficult to inspect the interior of the valve when the valve seat is being machined.

A further example from the technical point of view is disclosed by U.S. Pat. No. 742 313 and U.S. Pat. No. 4,715,149. In the case of the arrangement according to the fire of these publications, jaws in the form of levers are used to secure and centre the arrangement, the jaws being provided with teeth and arranged so that they are urged outwards against the wall of the valve opening, the wall being provided with a thread.

In the case of further known devices of the above-mentioned type, the support is arranged so as to be secured to the valve housing by means of a mounting plate, or a yoke as in the case of the latter publication. The plate or yoke is secured in different ways depending on the design of the valve housing. If the housing is constructed with screws, they can naturally be used but this assumes that the plate has been provided with bores located such that they match the location of the screws. This presents problems if the instrument is to be used for different valve sizes, in particular if it is considered that the tool pillar below the instrument has to be located exactly in the centre of the opening. The instrument can even be secured by means of chains and belts but this evidently involves a serious risk of unsatisfactory machining results.

A difficult problem is that the machining tool wears down comparatively rapidly, such that the arrangement has to be disconnected from the valve housing so that the tool can be changed. This in turn means that, when the tool has been changed, the arrangement has to be re-aligned accurately relative to the housing and the part thereof to be machined. It is awkward and time-consuming to bring about this realignment with the necessary degree of accuracy, in particular as the known centring and securing members generally cover the entire opening in the housing, which makes it difficult to see thereinto.

SUMMARY OF THE INVENTION

The object of the present invention is to provide an arrangement of the initially mentioned type which enables the above-mentioned disadvantages to be overcome. This object is achieved in that the support comprises firstly a main part with three wings which are uniformly distributed about the tool pillar, in order to bring about at least the centring, and each of which comprises a first wing part, which is secured to the main part and has at least a first sliding surface inclined towards the tool pillar, and a second wing part which is operatively connected to the first wing part such that the wing parts can slide relative to each other along the sliding surface, and secondly members for detachably securing the wing parts relative to each other and the support relative to the valve housing.

BRIEF DESCRIPTION OF THE DRAWINGS

In the following the invention will be described in greater detail with reference to the appended drawing which shows schematically and in perspective an embodiment of an arrangement according to the invention.

DETAILED DESCRIPTION OF PREFERRED EMBODIMENTS

In the drawing 1 generally designates a valve housing of a type which has a valve seat 1a, which is formed by the end of a tubular body 1b, which is rigidly welded in the housing 1. In order to mount a valve cone and spindle (not shown in the drawing) for maneuvering the latter, the valve housing 1 is formed with a tubular sleeve 1c which is coaxial with the seat 1a and which has a circular opening 1d surrounded by a flat annular surface 1e.

When the seat surface 1a is damaged, it may require machining or the tubular body 1b may require changing, the body having to be released from the housing 1 as a result of a weld seam connecting these parts having to be ground away.

To this end, an arrangement of the type shown in the drawing is used. The arrangement comprises a support 2 which bears a tool pillar 3 which at its outer end is provided with a machining tool. In the embodiment shown, this is a grinding wheel 4 but it can also be a steel cutter, as explained below.

The support is disposed so as to rest on the annular surface 1e, whereby its position in a horizontal plane is accurately determined. The tool pillar 3 extends perpendicular to the plane determined by the annular surface 1e. In order to bring about rapid and accurate centring of the tool pillar 3, the support 2 comprises a main part with three wings disposed uniformly about the pillar 3. Each of these wings comprises a first wing part 2a which is secured to the main part and which has a continuous elongate opening 2a1 whose delimiting surfaces form sliding surfaces for a second wing part 2b. This is formed by members for securing the wing parts 2a, 2b to each other and for securing the second wing part 2b relative to the housing. To this end, the second wing part 2b has two lugs 2b1, between which the first wing part 2a is inserted, and a threaded bolt 2b2 which can be tightened is passed through the elongate opening 2a1 in the first wing part 2a such that it can slide along the sliding surfaces. In the embodiment shown in the drawing the securing members of the second wing part 2b are of the screw-clamp type of construction with a backing device 2b3, which is to engage about the edge of the opening 1d, and a clamp screw 2b5 which can be moved by a knob 2b4. By virtue of this construction of the support 2, accurate centring and reliable securing thereof are attained.

As stated above, the tool pillar 3 can be raised and lowered relative to the support and can be adjusted relative thereto by means of an adjusting screw 5. Rough adjustment can be carried out with a bush 11 with a locking screw which can be actuated by means of an arm 11a. The tool pillar 3 has at its outer end members arranged for support against the inner delimiting surface of the tubular body 1b and comprising a disc 6a directed towards the tool pillar 3 and provided with three journals 6b which can be adjusted such that they can be fitted to rest against the delimiting surface.

The grinding wheel 4 is operatively connected to a compressed air motor 7 which is disposed to drive the grinding wheel 4 such that it rotates about its own axis. The compressed air is supplied to the motor 7 via a channel inside the tool pillar 3 to which a compressed air hose 8 is connected. A further compressed air hose 9 is connected to a compressed air motor 10 disposed so as to rotate the tool pillar 3 about its own axis.

The use of a grinding wheel does not per se give rise to lateral forces which would require the use of the support member 6 but this part is certainly required if the machining tool used is a steel cutter. Such a tool is used, for example, when a valve seat is rough-cut.

It will be appreciated that the invention is not restricted to the embodiment shown in the drawing and explained above. On the contrary, a person skilled in the art can, within the scope of the inventive concept, modify the design of the arrangement with respect, for example, to the members for securing the support relative to the valve housing and the wing parts to each other and with respect to the motors 7, 10 for driving the grinding wheel 4 and tool pillar 3, respectively. These motors can naturally also be electric or hydraulic motors if this is advantageous in the prevailing conditions.

I claim:

1. Arrangement for machining a valve seat in a valve housing having a circular opening which is concentric with the seat and about which is disposed a flat annular surface, the arrangement comprising a support, disposed so as to be centered relative to the opening and secured with the valve housing, and a tool pillar which is connected to the support and which, at a distal end of the tool pillar, is provided with a machining tool, the support being arranged such that in a direction, which, when the arrangement is in use, is perpendicular to the annular surface, the support holds the tool pillar such that the tool pillar can be adjusted in said direction, and the tool is arranged so as to rotate about the tool pillar, wherein the support comprises firstly a main part with three wings which are uniformly distributed about the tool pillar, in order to bring about at least centering, and each of which comprises a first wing part, which is secured to the main part and has at least a first sliding surface inclined towards the tool pillar, and a second wing part, which is operatively connected to the first wing part such that these wing parts can slide relative to each other along the sliding surface, and secondly members for detachably securing the wing parts relative to each other and the support relative to the valve housing.

2. Arrangement according to claim 1, wherein the tool pillar at its distal end is formed with members disposed to be supported on the wall of the seat.

3. Arrangement according to claim 1, wherein the tool is a grinding wheel.

4. Arrangement according to claim 1, wherein the tool is a steel cutter.

* * * * *